UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

1,001,919.  Specification of Letters Patent.  Patented Aug. 29, 1911.

No Drawing.   Application filed September 13, 1910.   Serial No. 581,796.

*To all whom it may concern:*

Be it known that we, WILHELM BAUER, residing at Vohwinkel, and ALFRED HERRE and RUDOLF MAYER, residing at Elberfeld, Germany, doctors of philosophy, chemists, citizens of the German Empire, have invented new and useful Improvements in New Vat Dye, of which the following is a specification.

Our invention relates to the manufacture and production of new and valuable vat dyestuffs. They are obtained by condensing isatin compounds in which the oxygen of the alpha-keto group is replaced by easily movable or replaceable substituents, e. g. halogen, sulfur, the amino group, the alkoxy group, with the acenaphthenone of the formula:

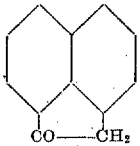

The new dyes are in a dry state dark reddish-brown crystalline powders with a metallic luster which are soluble in hot benzene generally with a bluish red coloration, and which yield with hydrosulfite and caustic soda lye vats dyeing cotton after exposure to air red to violet shades.

In order to illustrate the new process more fully we can proceed as follows, the parts being by weight: 305 parts of dibromoisatin are converted into dibromoisatin chlorid by heating it in a dry benzene suspension with 210 parts of $PCl_5$. The mixture thus obtained is then poured into a solution which is well stirred of 175 parts of acenaphthenone in dry benzene and is heated for about half an hour. The dye is filtered off and washed. It is a reddish-brown crystalline powder soluble in hot benzene with a bluish-red and in cold sulfuric acid with a green and in hot sulfuric acid with a blue color. By treatment with hydrosulfite and NaOH a violet vat results from which cotton is dyed in pure fast bluish-red shades.

The dyestuff is probably formed according to the following formulæ:

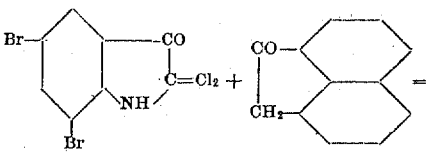

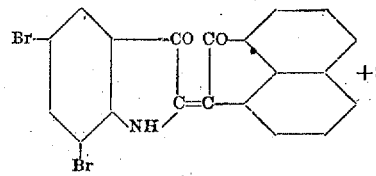

Other of the above mentioned isatin derivatives may be used, e. g. alpha-isatin-anilid, chloro-, bromo-, chloro-bromo- or dichloroisatin chlorid, ortho-bromo-para-methyl-isatin chlorid, para-bromo-ortho-methylisatin chlorid, tri-bromoisatin chlorid, ortho-methylisatin chlorid, ortho-para-dimethylisatin chlorid, para-bromo-ortho-methylisatin anilid, para-methylisatin-alpha-para-toluidid, isatin chlorid, dibromo-beta-naphthisatin chlorid, etc.

We claim:—

1. The herein described new dyestuffs being condensation products of an isatin compound in which the oxygen of the alpha-keto group is replaced by an easily movable or replaceable substituent and acenaphthenone, which dyestuffs are in a dry state dark reddish-brown crystalline powders with a metallic luster which are soluble in hot benzene generally with a bluish-red coloration, and which yield with hydrosulfite and caustic soda lye vats dyeing cotton after exposure to air red to violet shades, substantially as described.

2. The herein described new dyestuff being a condensation product of dibromo-isatin-alpha-chlorid and acenaphthenone, which dyestuff is in a dry state a dark reddish-brown crystalline powder, soluble in hot benzene with a bluish red and in cold concentrated sulfuric acid with a green and in hot sulfuric acid with a blue coloration, and which yields with hydrosulfite and caustic soda lye a violet vat from which cotton is dyed bluish-red, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
CHAS. J. WRIGHT,
ALFRED HENKEL.